No. 653,094. Patented July 3, 1900.
D. KIRKMAN.
HYDRAULIC AIR COMPRESSOR.
(Application filed Dec. 23, 1899.)
(No Model.) 3 Sheets—Sheet 1.

Witnesses:-
Robert S. Blake
Louis M. Whitehead

Inventor:
Daniel Kirkman.
by his Attorneys:-
Howson & Howson

No. 653,094. Patented July 3, 1900.
D. KIRKMAN.
HYDRAULIC AIR COMPRESSOR.
(Application filed Dec. 23, 1899.)
(No Model.) 3 Sheets—Sheet 2.

Witnesses:
Robert S. Blake
Louis M. T. Whitehead

Inventor:
Daniel Kirkman
by his Attorneys
Howson & Howson

No. 653,094. Patented July 3, 1900.
D. KIRKMAN.
HYDRAULIC AIR COMPRESSOR.
(Application filed Dec. 23, 1899.)
(No Model.) 3 Sheets—Sheet 3.

Witnesses:
Robert S. Blake
Lewis M. Whitehead

Inventor.
Daniel Kirkman.
by his Attorneys
Hawson & Howson

UNITED STATES PATENT OFFICE.

DANIEL KIRKMAN, OF PHILADELPHIA, PENNSYLVANIA.

HYDRAULIC AIR-COMPRESSOR.

SPECIFICATION forming part of Letters Patent No. 653,094, dated July 3, 1900.

Application filed December 23, 1899. Serial No. 741,420. (No model.)

*To all whom it may concern:*

Be it known that I, DANIEL KIRKMAN, a citizen of the United States, residing in Philadelphia, Pennsylvania, have invented certain Improvements in Hydraulic Air-Compressors, of which the following is a specification.

My invention relates to that class of air-compressors in which the compression of the air is effected by the rise of water under pressure in a vessel from which the compressed air escapes at the top, the charge of water being then permitted to escape from the bottom of the vessel prior to a repetition of the operation.

The objects of my invention are to provide for the practically-complete filling and emptying of the vessel at each operation, so as to insure the delivery of a maximum quantity of air, to insure the quick opening and closing of the valves which govern the inlet and discharge of the water, and to prevent the premature closing of the water-outlet valve by the action of the escaping water. These objects I attain in the manner hereinafter set forth, reference being had to the accompanying drawings, in which—

Figure 1:
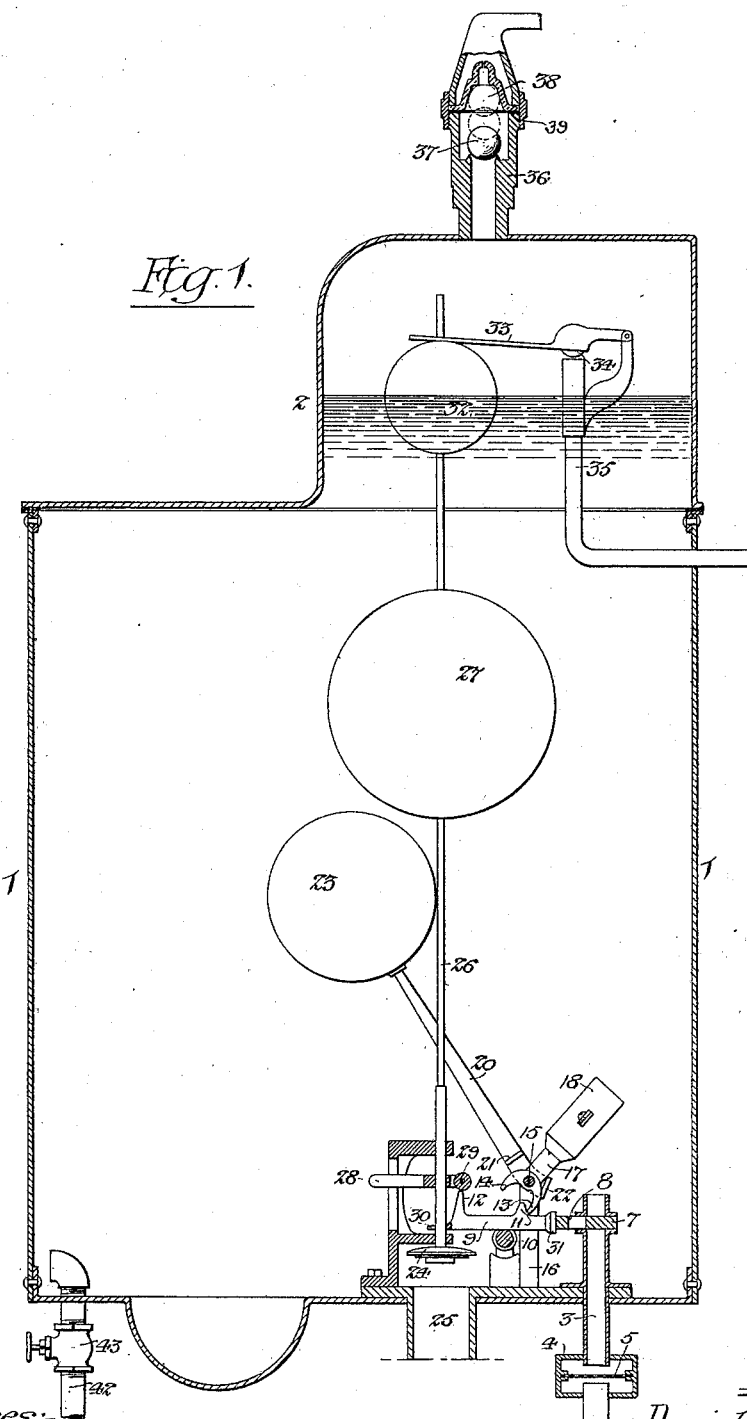
Figure 2:
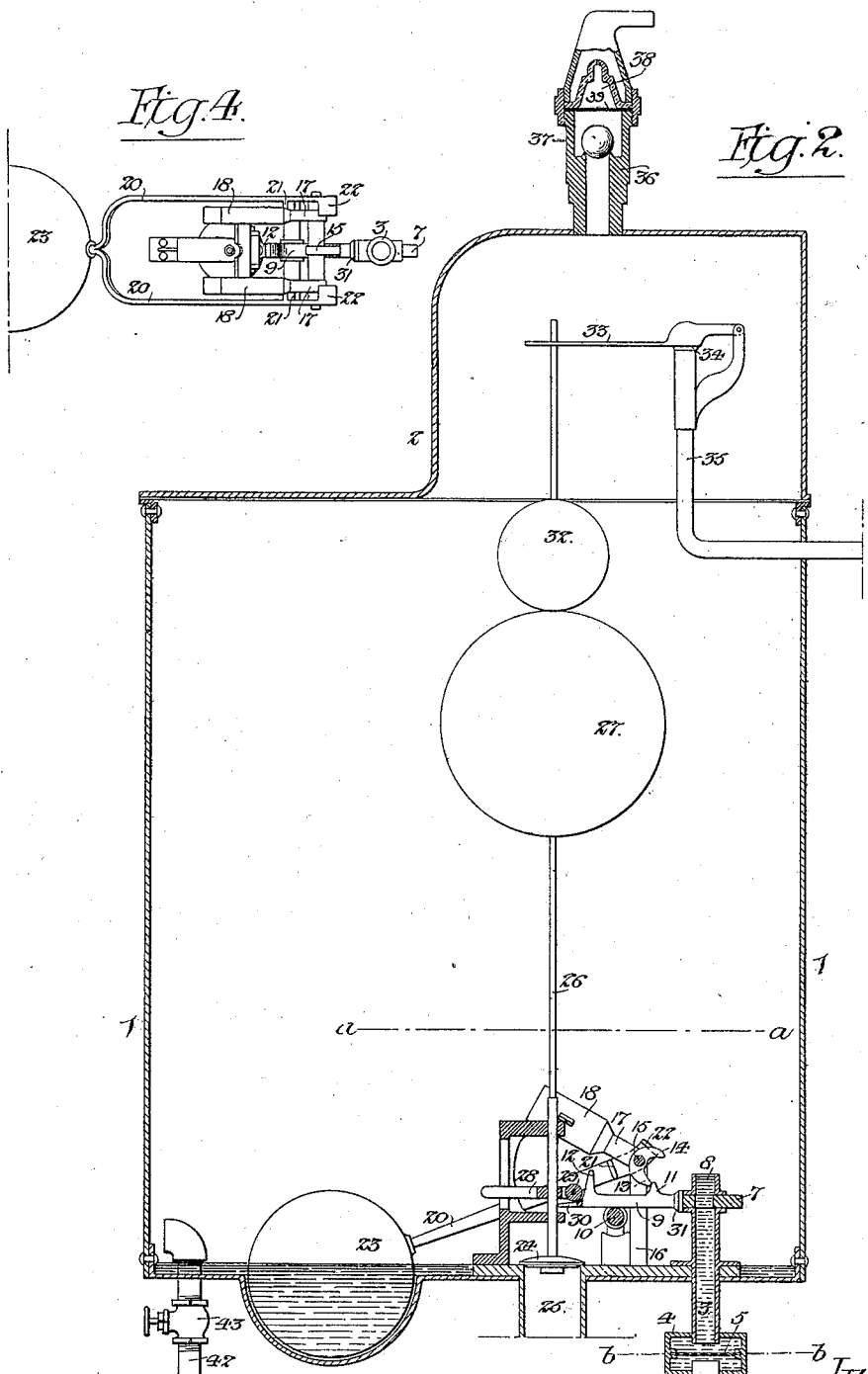
Figure 3:
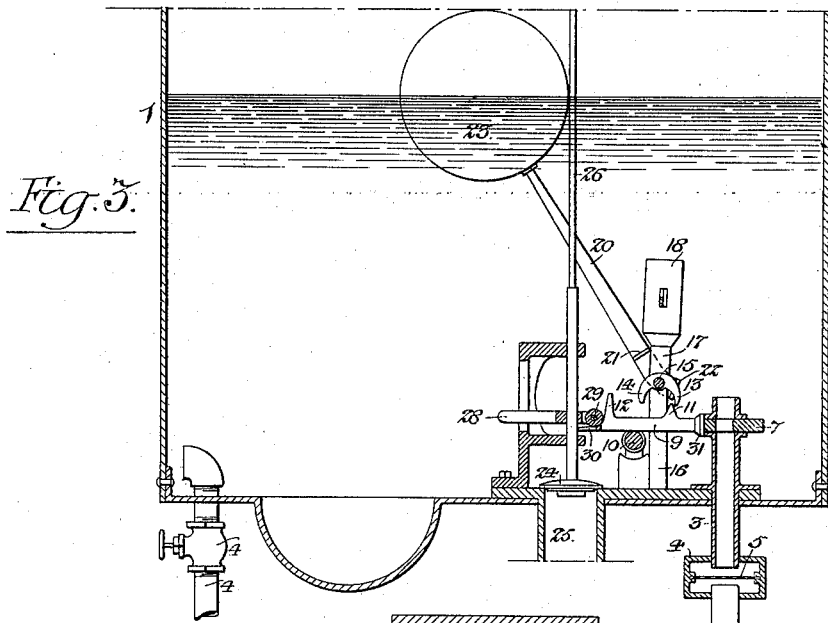
Figure 5:
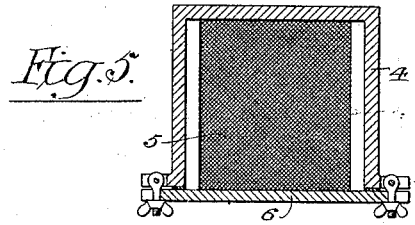
Figure 6:
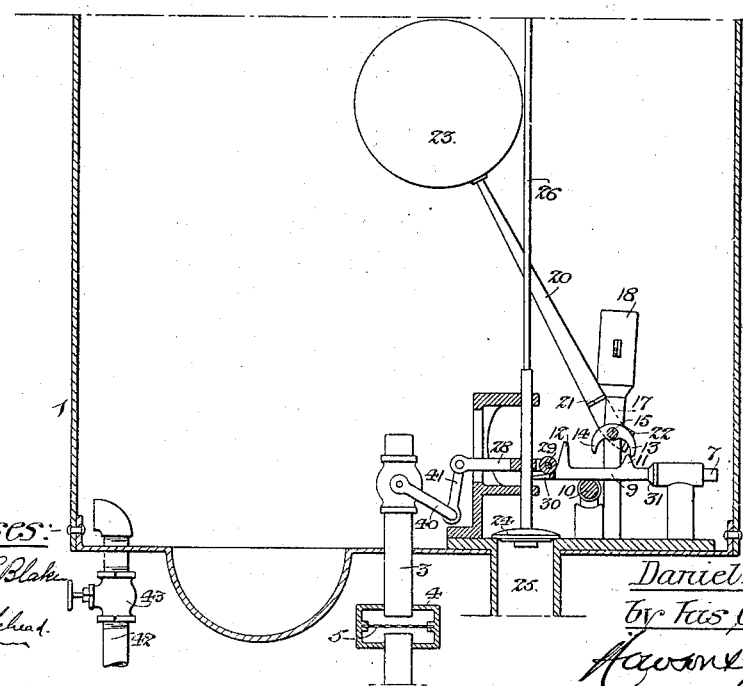

Figure 1 is a sectional view of my improved air-compressing apparatus, showing the parts in the position which they assume when the compressing vessel has received its full charge of water. Fig. 2 is a similar view illustrating the positions assumed by the parts when the compressing vessel is empty. Fig. 3 is a view of the lower portion of the compressing vessel, illustrating the position assumed by the parts when the vessel has been partly filled by the inflowing water. Fig. 4 is a sectional plan view on the line $a\,a$, Fig. 2. Fig. 5 is an enlarged sectional plan on the line $b\,b$, Fig. 2; and Fig. 6 is a view of the lower portion of the compressing vessel, illustrating another embodiment of my invention.

The compressing vessel 1 may be of any suitable shape and dimensions, being preferably composed of sheet metal of such strength as to withstand the pressure to which it is subjected and having by preference a projecting top dome 2, so as to limit the volume of water in the upper portion of the vessel and cause a more rapid rise of the water therein than would be possible if the expanded area of the lower portion of the vessel were carried to the top, it being understood that the pressure upon the water gradually increases as the water rises in the compressing vessel until said pressure equals that in the compressed-air reservoir, whereupon the check-valve 37 opens and permits the air to flow from the vessel 1.

The water inlet and supply pipe is shown at 3, this pipe communicating with the lower portion of the compressing vessel 1 and having its continuity interrupted by a box or casing 4, in which is a screen 5, adapted to guides at the opposite sides of the casing 4, so that it can be readily inserted or withdrawn, the front 6 of the casing being detachable and being normally held in place by means of swinging screw-fastenings 7 or equivalent means, whereby it can be readily removed when it is desired to gain access to the screen 5 for the purpose of removing, cleansing, or replacing the same.

The upper portion of the inlet-pipe 3 forms a guide for a sliding valve 7, having a port 8, which by the movement of said valve can be brought into or out of register with the opening in the pipe 3, so as to permit or cut off the flow of water into the compressing vessel 1 through said pipe. The projecting stem 9 of the valve is supported and guided upon an antifriction-roller 10, having a spindle mounted in suitable bearings at the bottom of the vessel 1, and said stem 9 has two projecting lugs 11 and 12. The lug 11 is adapted to be acted upon by one or other of a pair of arms 13 and 14 of a rocker 15, which is mounted so as to be free to swing upon standards 16 at the bottom of the vessel 1, said rocker having other arms 17, with weights 18, whereby the rocker is normally maintained in one or other of its extreme positions of adjustment.

Upon the shaft of the rocker 15, or upon the shaft or spindle upon which the same is mounted, is also mounted a forked lever 20, having tappets 21 and 22 and carrying a float-ball 23, the tappets 21 and 22 projecting so as to overlap the arms 17 of the rocker 15, and thus provide for imparting movement to said rocker at the proper times.

A valve 24 closes the water outlet or discharge 25 at the bottom of the vessel 1, and said valve has an upwardly-projecting stem 26, guided in suitable bearings in the lower portion of the vessel 1 and having secured to it a float-ball 27 and an arm 28, the latter being provided with an antifriction-roller 29, which operates in conjunction with the lug 12 of the valve-stem 9 in the manner hereinafter set forth. The inner end of said valve-stem 9 is forked, as shown at 30, Fig. 2, so as to embrace the stem 26 of the valve 24 and by contact with said stem limit the inward movement of the valve-stem 9, and consequently the closing movement of the valve 7, the opening movement of said valve being restricted by contact of a collar 31 on the valve-stem, with the valve-casing forming part of the inlet-pipe 3.

Free to slide on the upper end of the valve-stem 26 is a supplementary float-ball 32, which is adapted to act upon a lever 33, carrying an air-inlet and pressure-relief valve 34, which normally closes the inner end of a pipe 35, projecting upwardly into the dome 2 of the compressing vessel.

The dome 2 has at the top the air-discharge chest 36, the latter having a double check-valve therein, the lower valve consisting of a ball 37, of rubber or equivalent material, adapted to close against a seat in the chest 36, and the upper valve consisting of an inverted cup 38, of rubber or other elastic material, slotted so as to form lips, which will be spread apart by the upward passage of air, but will be closed against any downward passage or backflow of air.

The operation of the apparatus is as follows: Supposing the parts to be in the position shown in Fig. 2—that is to say, with the outlet-valve 24 closed, the inlet-valve 7 open, and the float-ball 23 in its lowest position— water enters the lower portion of the vessel 1 and rising therein lifts the float-ball 23 and raises the lever 20 until its tappets 21 move the weighted arms 17 of the rocker 15 to a position beyond a vertical line drawn through the axis of the rocker, whereupon the weighted arms will fall until the arm 14 of the rocker comes into contact with the lug 11 on the stem 9 of the valve 7, as shown in Fig. 3. The stem 9 cannot, however, be moved by the rocker, so as to close the valve 7, because of the contact of the lug 12 with the roller 29 on the arm 28, and the parts remain in this position as the water continues to rise in the vessel 1. The float-ball 27 next becomes submerged; but the lifting power of said float-ball is not sufficient to raise the valve 24 against the pressure to which the water is now subjected, and as the water continues to rise the sliding float-ball 32 is raised and finally acts upon the lever 33 and lifts the same, so as to open the valve 34 at the top of the pipe 35. Hence the air under pressure in the upper portion of the dome 2 is permitted to escape therefrom, and the pressure upon the valve 24 being thus relieved the buoyancy of the float-ball 27 is sufficient to raise said valve, and thus open the water-discharge pipe 25, the same movement withdrawing the antifriction-roller 29 from engagement with the lug 12 of the valve-stem 9 and permitting the weighted rocker to move said valve-stem to the position shown in Fig. 1, so as to close the valve 7 and cut off the further inflow of water into the vessel 1, the opening of the valve 24 and the closing of the valve 7 being practically simultaneous, so that there will be no inflow of water into the compressing vessel while the outlet-valve is open, thereby preventing waste. When the outlet-valve 24 is raised to the position shown in Fig. 1, the lug 12 of the valve-stem 9 is inserted beneath the antifriction-roller 29 of the arm 28, and thus prevents the premature closing of the said valve by the downward rush of water around the same. As the water falls in the vessel 1 the first effect is to lower the sliding float-ball 32 until it rests upon the float-ball 27, the water then falling away from the latter, so that the weight of the same can be exerted to close the valve 24 as soon as the lug 12 is withdrawn from beneath the antifriction-roller 29. As the water continues to descend the float-ball 23 descends with it, until finally the tappets 22 of the lever 20, acting upon the arms 17 of the rocker 15, carry the weights 18 beyond a vertical line drawn through the axis of the rocker, whereupon said weights will fall and cause the arm 13 of the rocker to act upon the lug 11 of the valve-stem 9 and again move the same to the position shown in Fig. 2, thereby opening the valve 7 and at the same time withdrawing the lug 12 from beneath the antifriction-roller 29, so as to permit of the closing of the outlet-valve 24, the movement of the two valves in this case, as before, being practically simultaneous, so as to prevent waste of water by permitting inflow while the discharge-valve is open.

It will be observed that the vessel 1 is practically filled before closing the inlet-valve and opening the discharge-valve and practically empty before a reversal of these operations, so that a volume of air equal to substantially the full capacity of the vessel 1 is discharged on each operation of the device.

It will be understood that as the water falls in the vessel 1 air enters the upper portion of the same through the pipe 35, the valve 34 lifting to permit such inflow of air.

The air-inlet valve may be independent of the pressure-relief valve, if desired.

Instead of employing a sliding valve 7 for controlling the inlet of water, as in Figs. 1 and 2, I may, if desired, employ a rocking inlet-valve, the rocking plug having an arm 40, connected by a link 41 to the arm 28 on the valve-stem 26, as shown in Fig. 6, or said arm 40 may, if desired, be connected to the sliding stem 9.

The check-valve 37 acts both to prevent inflow of air into the vessel 1 and also to prevent outflow of water therefrom into the air-pipe in the event of any derangement of the valve mechanism in the lower portion of the vessel 1, which would permit undue rise of the water in said vessel, the valve in this case closing against the seat formed by a washer 39 at the base of the valve structure 38, as shown by dotted lines in Fig. 1.

In case it is desired to effect a quicker compression of the air than would be effected by the flow of water through the valved inlet-pipe 3—as, for instance, in starting the apparatus in the morning after pressure has been allowed to run down during the night—the attendant opens a valve 42 in a supplementary inlet-pipe 43, keeps it open while the vessel 1 is receiving its first charge of water, and then closes it, the result being that the vessel is filled in a much shorter time than if the only inlet of water thereto was through the pipe 3.

Having thus described my invention, I claim and desire to secure by Letters Patent—

1. A hydraulic air-compressor in which are combined a vessel having a valved outlet for compressed air, a valved inlet and a valved outlet for water, an air-pressure relief and inlet valve or valves, and means for operating the same, a water-outlet valve-stem having a float for lifting the same, a support for holding the water-outlet valve in the open position, and float mechanism for withdrawing said support as the water falls in the vessel, substantially as specified.

2. A hydraulic air-compressor in which are combined a vessel having a valved outlet for compressed air, a valved inlet and a valved outlet for water, an air-pressure relief and inlet valve, or valves, and means for operating the same, a water-outlet valve-stem having a float for lifting the same, a support on the stem of the water-inlet valve for holding the water-outlet valve in the open position, and float mechanism for opening the inlet-valve and withdrawing said support as the water falls in the vessel, substantially as specified.

3. A hydraulic air-compressor in which are combined a vessel having a valved outlet for compressed air, a valved water-inlet and a valved water-outlet, a water-outlet valve-stem, a float for raising the same, an air-pressure relief and inlet valve or valves, and mechanism for operating the same, a support on the stem of the water-inlet valve for holding the water-outlet valve in the open position, and float mechanism for opening the inlet-valve and withdrawing said support as the water falls in the vessel, the water-outlet valve-stem having a portion for engaging with the said support when said outlet-valve is closed, whereby the water-inlet valve is retained in the open position, substantially as specified.

4. A hydraulic air-compressor in which are combined a vessel having a valved outlet for compressed air, a valved water-inlet, and a valved water-outlet, an air-pressure relief and inlet valve or valves, and mechanism for operating the same, a float for opening the water-outlet valve, means for supporting said outlet-valve in the open position, a weighted rocker for imparting motion to said supporting device, and a float-lever for operating said weighted rocker, substantially as specified.

5. A hydraulic air-compressor in which are combined a vessel having a valved outlet for compressed air, a valved water-inlet, and a valved water-outlet, an air-pressure relief and inlet valve or valves, mechanism for operating the same, a float for opening the water-outlet valve, an arm on said valve-stem carrying an antifriction-roller, a supporting device engaging with said antifriction-roller and serving to hold the outlet-valve in the open position, and float-operated mechanism for actuating said support, substantially as specified.

In testimony whereof I have signed my name to this specification in the presence of two subscribing witnesses.

DANIEL KIRKMAN.

Witnesses:
F. E. BECHTOLD,
JOS. H. KLEIN.